Feb. 26, 1957 H. HERLACH 2,782,687
GUN CARRIAGE WITH PEDAL-CONTROLLED TRAINING
Filed May 16, 1952 6 Sheets-Sheet 2
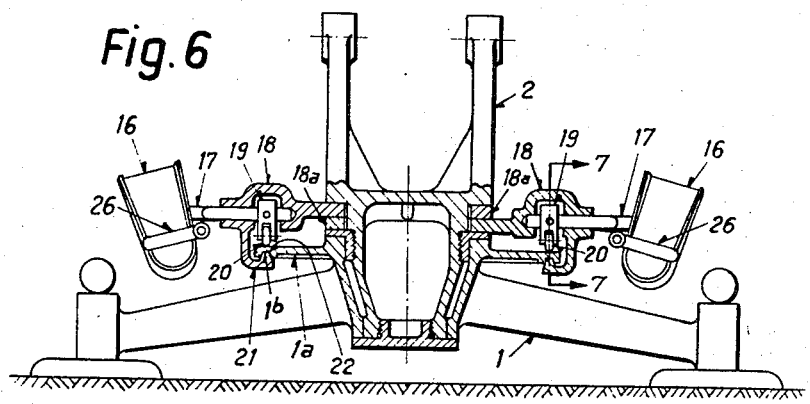
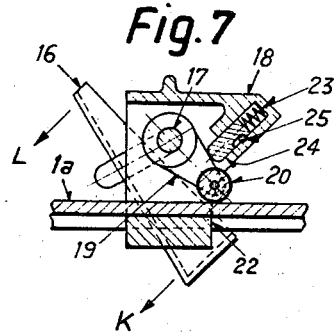
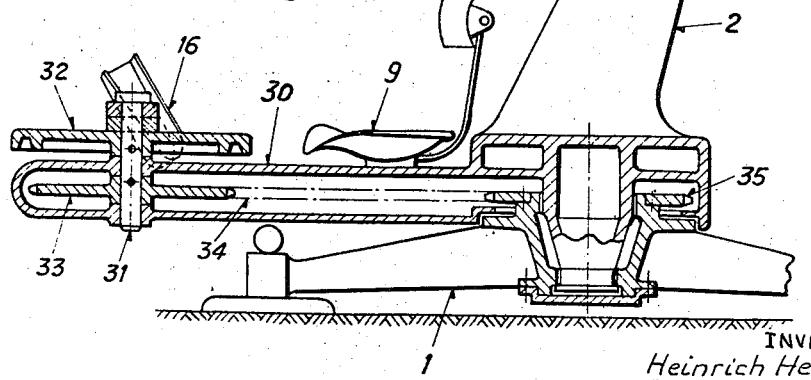
INVENTOR
Heinrich Herlach
BY
Richard Geier
ATTORNEYS Feb. 26, 1957 H. HERLACH 2,782,687
GUN CARRIAGE WITH PEDAL-CONTROLLED TRAINING
Filed May 16, 1952 6 Sheets-Sheet 3
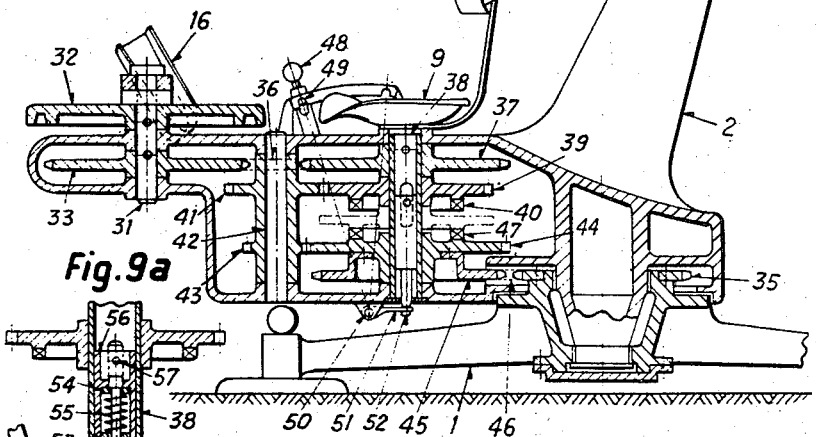
Fig. 9
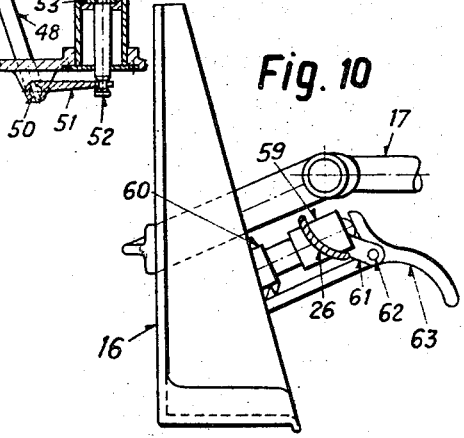
Fig. 9a
Fig. 10
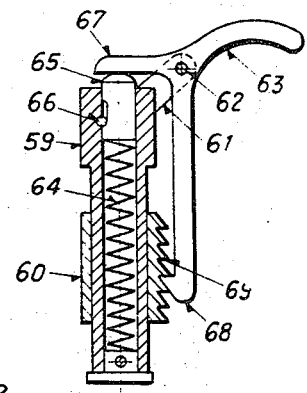
Fig. 12
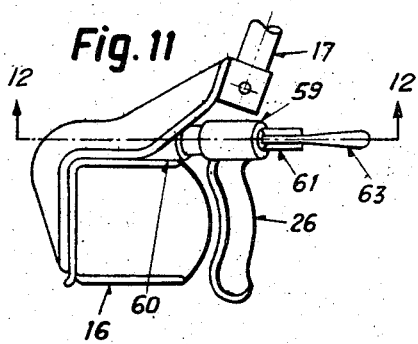
Fig. 11
INVENTOR:
Heinrich Herlach
BY
Richards & Geier
ATTORNEYS Feb. 26, 1957   H. HERLACH   2,782,687
GUN CARRIAGE WITH PEDAL-CONTROLLED TRAINING
Filed May 16, 1952   6 Sheets-Sheet 4

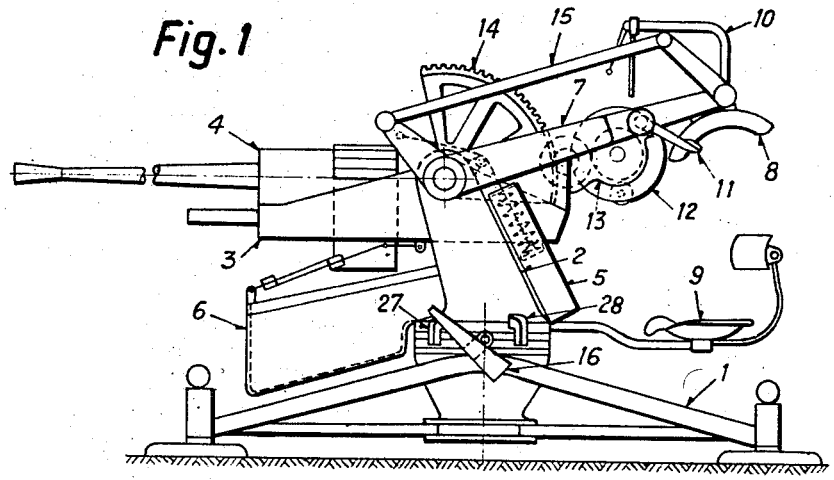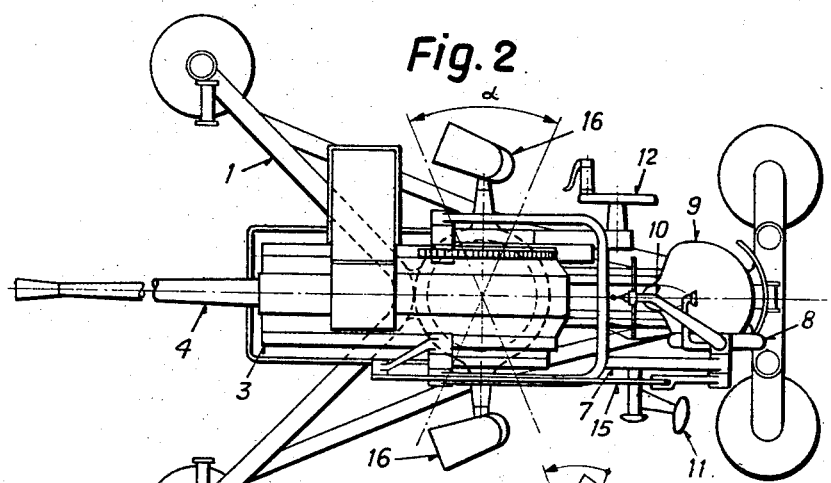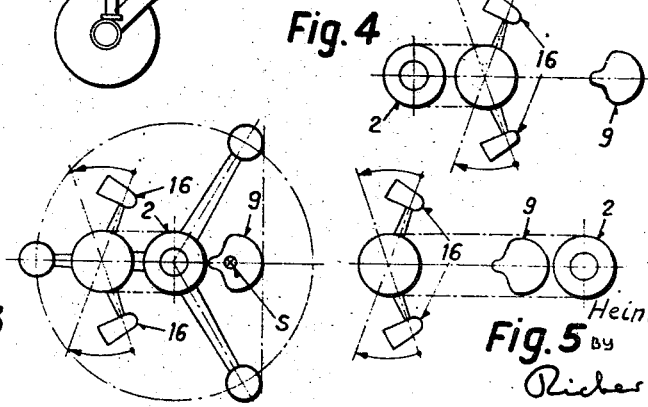

INVENTOR:
Heinrich Herlach
BY
Richards & Geier
ATTORNEYS

Feb. 26, 1957     H. HERLACH     2,782,687
GUN CARRIAGE WITH PEDAL-CONTROLLED TRAINING
Filed May 16, 1952     6 Sheets-Sheet 5
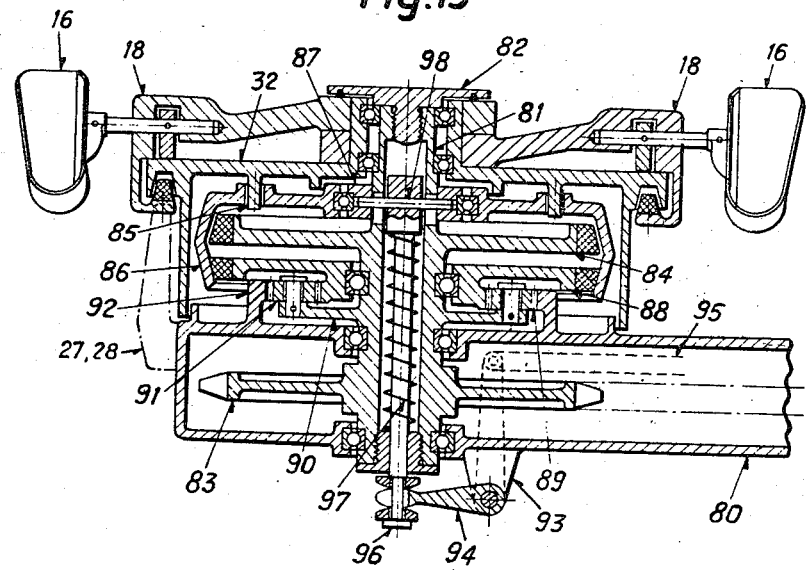
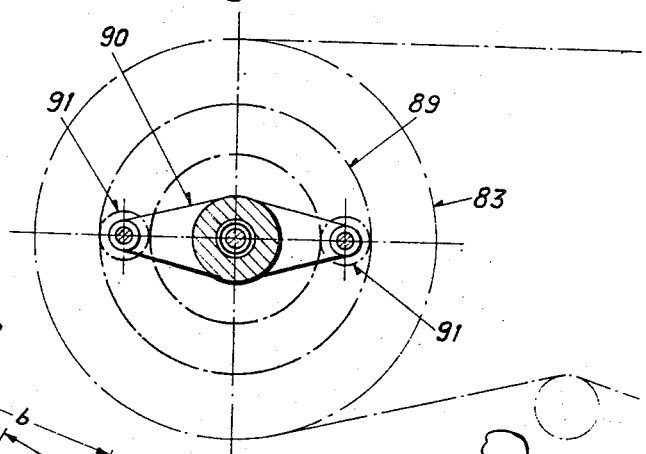
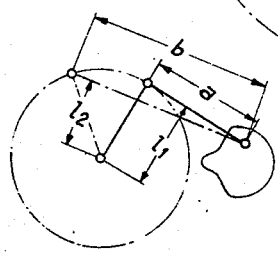
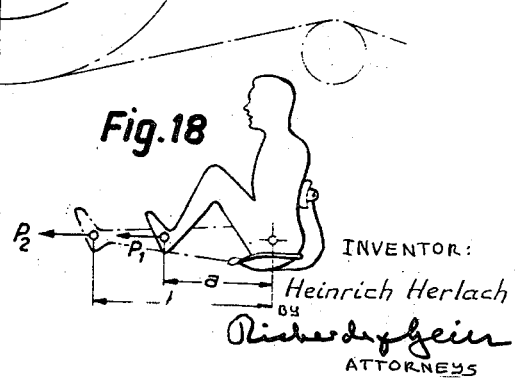
INVENTOR:
Heinrich Herlach
ATTORNEYS Feb. 26, 1957 H. HERLACH 2,782,687
GUN CARRIAGE WITH PEDAL-CONTROLLED TRAINING
Filed May 16, 1952 6 Sheets-Sheet 6
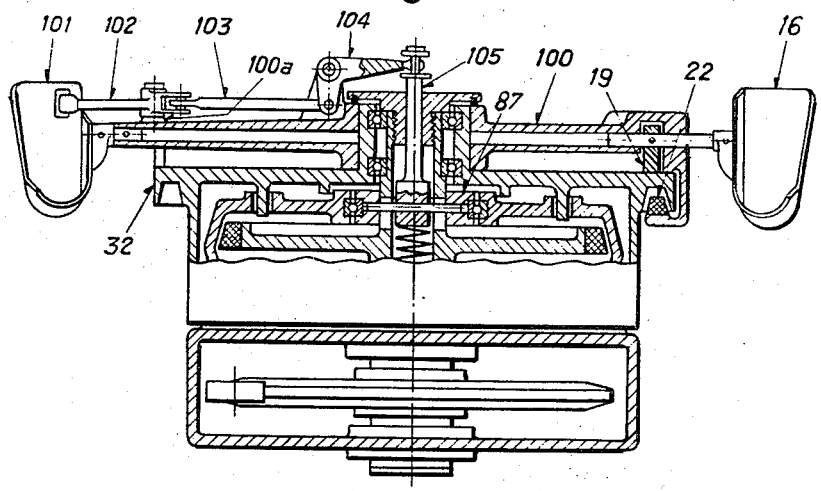
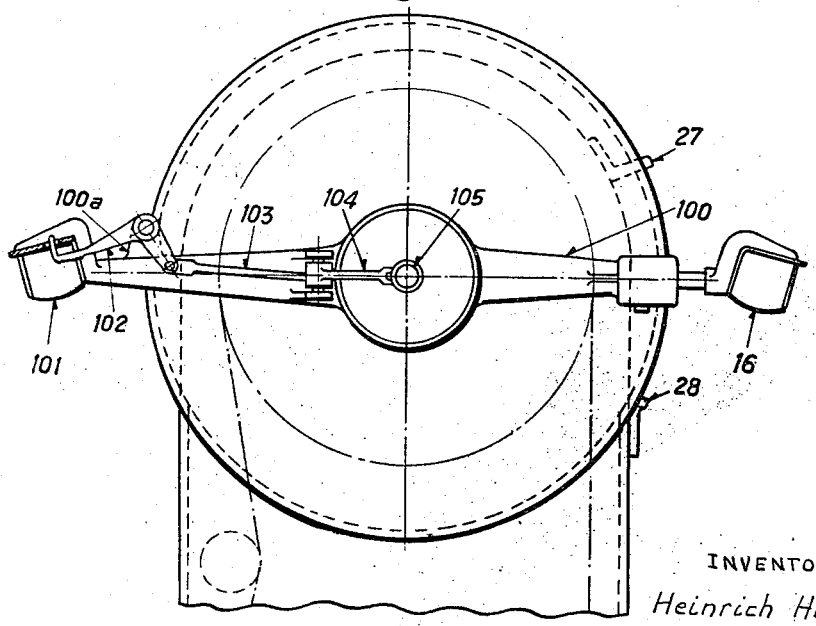
INVENTOR:
Heinrich Herlach
BY
ATTORNEYS

United States Patent Office 2,782,687
Patented Feb. 26, 1957

2,782,687

GUN CARRIAGE WITH PEDAL-CONTROLLED TRAINING

Heinrich Herlach, Zurich, Switzerland, assignor to Machine Tool Works Oerlikon, Administration Company, Zurich-Oerlikon, Switzerland, a Swiss company Application May 16, 1952, Serial No. 288,134

7 Claims. (Cl. 89—41)

In the majority of gun carriages, aiming in train and elevation is effected by means of handwheels actuated by the gunner. Where aiming speeds are high, however, it is in practice impossible for a gun-aimer using the handwheels to aim in both train and elevation with the necessary accuracy, as the oppositely-directed movements involved cannot be performed by a human being with his arms. In order to eliminate this drawback, gun carriages have been built in which aiming in train is effected by the grounded feet of the seated gunner. Since a man can exert more force with his legs than with his arms, substantially higher aiming speeds can be achieved in this way. Aiming in elevation is done by means of a handwheel. Whilst this arrangement eliminates to a considerable extent the aforementioned drawbacks of conventional gun carriages, it has certain other inadequacies. In the first place, in order to enable the gunner to exert the necessary force, the seat must be located a predetermined distance above the ground, whereby a corresponding overall height of the gun is necessitated which renders camouflaging difficult. Furthermore, the gun-training force exerted by the feet of the gunner intimately depends on the degree of purchase afforded by the surface of the ground; and, finally, tripod legs and the like seriously hinder the gunner when aiming. The present invention overcomes this drawback.

The gun carriage according to the invention has a lower section, an upper section mounted thereon and rotatable about the training axis, and a seat, connected to the upper section, for the gunner, and is characterized by the fact that pedals swinging about a vertical axis are provided for the gunner's feet, at least one of which pedals is tiltable about an axis and can be coupled by the tilting movement to members connected to the lower section. In the gun carriage according to the invention the minimum height of the seat is determined only by the interfering edges of the undercarriage and may therefore be very small. The gun carriage accordingly constitutes a smaller target, and can be more satisfactorily camouflaged, and the distance between the axis of bore and the sighting line is reduced.

Whereas in the known gun carriages, in which aiming in train is effected by the feet of the gunner, only one component of the forces exerted by the feet can be utilized for the purpose of training the gun, in the gun carriage according to the invention the whole of the force exerted by the legs is utilized for actuating the gun carriage. A substantial advantage inherent in the inventive arrangement is that the gunner's trunk is not unsettled by the leg movements.

In the drawing, several typical embodiments of the invention are depicted, as follows:

Figure 1 is an elevational view of the gun carriage according to the invention;

Figure 2 is a plan view of the gun carriage to Figure 1;

Figures 3 to 5 show diagrammatically the relative disposition of the gun pivot, the pedals and the seat;

Figure 6 is a vertical sectional view of the lower portion of the gun carriage;

Figure 7 is a sectional view along the line VII—VII of Fig. 6;

Figure 8 is a longitudinal sectional view of a second embodiment of a gun carriage in accordance with the invention;

Figure 9 is a sectional view of a third embodiment of a gun carriage according to the present invention;

Figure 9a is a sectional view, on an enlarged scale of the gear change mechanism of the embodiment shown in Figure 9;

Figure 10 is an enlarged elevational view of the pedal;

Figure 11 is a plan view of the pedal to Figure 10;

Figure 12 is a sectional view along the line XII—XII of Figure 11;

Figure 15 is a sectional view of a further embodiment of the training gear;

Figure 16 is a schematic representation, in plan view, of the training gear according to Figure 15;

Figure 17 is a schematic representation, in plan view, of the arrangement of the seat and pedals;

Figure 18 is a schematic representation, in elevational view, of the arrangement of the seat and pedals;

Figure 19 is a fragmentary sectional view of a further embodiment of the training gear; and Figure 20 is a plan view according to Figure 19.

Figure 13:
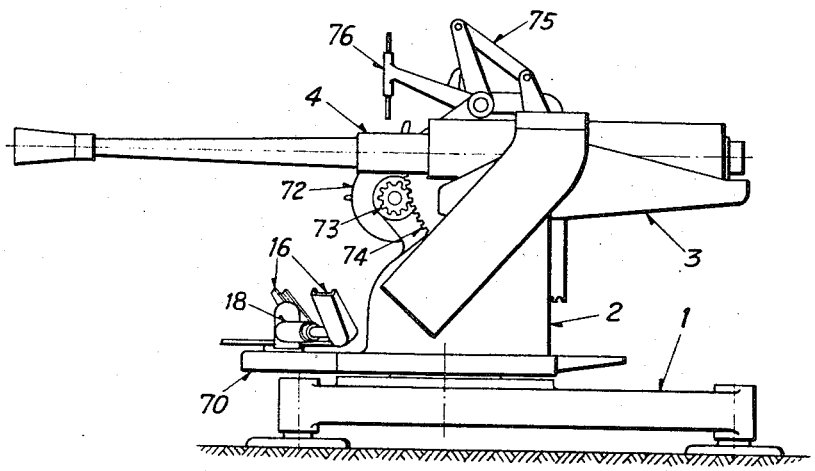
Figure 13 is an elevational view of a fourth embodiment of a gun carriage according to the present invention.

The gun carriage depicted in Figures 1, 2 and 6 has a tripod 1 constituting a lower immovable supporting member on which the cradle mount member 2 is rotatably arranged. The cradle 3 carries the gun proper 4. The weight of the cradle 3 and the gun proper 4 is compensated by the compensator 5 on the cradle mount. Below the cradle, on the cradle mount 2, is disposed the cartridge-case bin 6 for the spent cartridge cases. The aiming arm 7 is movable and, with the shoulder rest 8, automatically accommodates itself to the physique of the gunner seated on the seat 9. The sight 10 is therefore at all times in a convenient position for the gunner. Arranged on the aiming arm is the lever 11 which, actuated by the gunner's forearm, fires the gun via a rod assembly not shown. Provided on an outrigger on the right side of the cradle mount is the elevation handwheel 12, which acts through the intermediate gearing 13 on the gear segment 14 secured to the cradle. The sight 10 is maintained parallel to the axis of the gun by means of the parallelogram rod assembly 15 connected to the cradle.

Two pedals 16, the construction of which is illustrated in Figures 6, 7 and 10 to 12, are provided for the gunner for the purposes of training the gun. The pedals 16 are pivotally mounted on pivots 17. The pivots 17 are arranged in the mounts 18, which in turn are mounted, for pivotal motion about the training axis of the gun, in an annular bearing extension 18a. Connected to each of the pivots 17 is a clamping device comprising a lever 19 carrying a clamping roller 20 at its end, said roller rolling on a coupling surface of a plate 1a constituting the coupling element of the tripod. The mount 18 embraces by means of an extension 21 the periphery of the plate 1a and carries a wedge-shaped clamping member 22 provided to engage a corresponding groove 1b in the plate 1a.

Via the bolt 24, the travel of which is limited by the pin 25, the spring 23 arranged in the mount 18 forces down the clamping lever 19 in such a way that the plate 1a and the clamping wedge 22 are brought into engagement through the action of the clamping roller 20. In order to give the feet of the gunner good purchase, straps or clips 26 are provided on the pedals 16. The straps are located beneath the tilting axis of the pedals, so that by retracting the foot the pedal is swivelled and the clamping lever released. The movement of the mounts 18 with the pedals 16 about the training axis is limited by the stops 27, 28 to the angle α (Figures 1 and 2).

The following is a description of the functioning of the device: In order to train the gun, the gunner places his feet in the pedals 16, where they are held by the straps or clips 26. If the gunner now presses with his heel against the pedal in the direction of the arrow K in Figure 7, the pedal will, with the mount 18, be locked to the plate 1a by the cooperation of the clamping lever 19 with the clamping wedge 22. The gunner can now turn the gun, together with his seat, by his movements, until the turning movement is arrested by the stops 27 or 28. These stops are intended to prevent the gunner's legs from being tripped or being extended too far. As soon as the stops 27, 28 approach the mount 18 of the pedals 16, the gunner, by pressing the pedals down in the direction of the arrow L in Figure 7, with the ball of his foot, or by drawing back his foot, can lift the clamping lever 19 with the roller 20 off the plate 1a against the action of the spring 23. As a result, the clamping action of the clamping wedge 22 is abolished and the mount 18 can be moved freely, so that the pedal can follow up. Thus, training of the gun is done by locking the pedals, bracing the body, and with it the movable section of the gun carriage, against the locked pedal; following up with the pedal released by pressing down the ball of the foot, and again locking and bracing. As the two pedals can be moved independently of one another, and as, owing to the arrangement of the strap 26, tractional forces also can be transmitted to the pedals, this principle of gun-aiming permits of extremely speedy and efficient aiming of the gun.

In the embodiment shown in Figures 1, 2 and 6, the mounts 18 of the pedals 16 are revolvable about the training axis of the gun carriage. The mounts 18, however, can also be arranged to revolve round another axis, in which case the movement of the pedals is transmitted to the gun carriage through gearing or, for example, by a chain. Several such embodiments are schematically represented in Figures 3 to 5. In the embodiment shown in Figure 3 the seat is located to the rear of the axis or pivot of the gun carriage, whilst the pedals with their mounts, i. e., the training gear, are disposed in front of the axis of the gun carriage. What is achieved by this arrangement is that the centre of gravity "S" of the gunner lies within the tilt line of the undercarriage even where the ground base is small, whereby the stability of the gun carriage is enhanced. In Figure 4 both the seat and the training gear are located to the rear of the axis of the gun carriage, whilst in the embodiment to Figure 5 the seat and the training gear are both in front of the gun carriage axis.

Figure 8 shows in longitudinal sectional view an embodiment of the gun carriage according to Figure 5. In this figure the tripod is again designated by the numeral 1 and the cradle mount by the numeral 2. Disposed on the cradle mount is an outrigger 30 which carries the seat 9 and, at its forward end, the training gear. The two pedals 16 are mounted with their mounts 18 on the pivot 31, which is arranged for rotation in the outrigger 30. The clamping plate 32 is rigidly connected to the pivot 31, as is also the chain wheel 33. By the movement of the pedals, the clamping plate 32 is turned, and with it the chain wheel 33. This rotation is transmitted by a chain 34 to the chain wheel 35 rigidly connected to the tripod, and thereby causes rotation of the gun about its training axis.

In Figure 9 a further embodiment of a gun carriage is shown. This embodiment is similar in construction to the embodiment shown in Figure 8, and identical components are designated by identical numerals. The difference between this embodiment and the previous one resides in the fact that a two-speed gear is disposed between the chain wheels 33 and 35. The chain wheel 33 is connected by the chain 36 to the chain wheel 37. The chain wheel 37 is rigidly connected to the hollow shaft 38. Mounted on the hollow shaft 38 is the spur wheel 39, which is equipped on one side with a jaw clutch coupling 40. The spur wheel 39 is intended to engage the spur wheel 41 which is provided on the shaft 42. Assembled with the spur wheel 41 is a spur wheel 43 which engages with the spur wheel 44 to which the chain wheel 45 is rigidly connected, the said chain wheel 45 acting through a chain 46 on the chain wheel 35. The spur wheel 39 with the jaw clutch coupling 40 is so mounted as to be able to slide longitudinally and can operate in two positions. In the position shown in Figure 9, the rotary movement of the chain wheel 37 is transmitted through spur wheel 39, spur wheel 41, spur wheel 43 and spur wheel 44 to chain wheel 45. By lowering the spur wheel 39 a transmission ratio for higher aiming speeds is set. In its lower position the spur wheel 39 is rigidly connected through the jaw clutch coupling 40 to the corresponding clutch 47 of the spur wheel 44. As a result, the drive proceeds from the chain wheel 37 directly to the chain wheel 45. For the purpose of cutting out the gearing a lever 48 is provided at the side of the seat 9, which lever engages in its two end positions by means of the spring plunger 49. The lever 48 is pivotally mounted on the pivot 50 and by means of an extension 51 actuates the ram or plunger 52 inside the hollow shaft 38. As shown in Figure 9a, a spring 55 is arranged on the ram or plunger 52 between two plates or discs 53, 54. The plates 53, 54 bear against shoulders of the sleeve 56, which is rigidly connected to the spur wheel 39 by the pin 57. If the lever 48 is actuated, so that the plunger 52 is drawn downwards, the plunger compresses the spring 55 by means of the plate 54. Under the pressure of the spring the sleeve 56 now moves downwards and thereby brings the claws or dogs 40 of the spur wheel 39 into engagement with the claws 47. Owing to the interposing of the spring 55, the lever 48 can at any time be moved over its entire travelling distance, even if the clutch dogs 40 and 47 do not immediately accommodate one another. In this case the claws or dogs are brought into engagement somewhat later by the spring. The reverse cycle of operations takes place when the plunger is moved upwards and the teeth of the spur wheel 39 do not immediately engage the teeth of the spur wheel 41.

In Figures 10 to 12 the strap or clip 26 of the pedal is depicted in closer detail. The strap is mounted by means of journals 59 in a mount 60 secured to the pedal, and carries, on an extension 61, the lever 63 pivoting on a pivot 62. Inside the journal 59 is a spring 64 which, acting on an extension 67 of the lever 63 through the bolt 65 whose travel is limited by the pin 66, tends to rotate the lever 63 in a clockwise direction. The lever 63 is provided with a hook or catch 68 which engages teeth 69 on the mount 60.

The following is a description of the functioning of the arrangement: The height of the strap 26 above the pedal can be reduced simply by sliding it down, when the pawl 68 will slide over the teeth 69 and engage at the desired position under the action of the spring 64. The gunner's foot is thereby held firmly by the strap. In order to release the strap, the lever 63 has to be turned anticlockwise against the action of the spring 64, when the pawl 68 is withdrawn from the teeth 69 and the strap can be drawn upwards.

Figure 14:
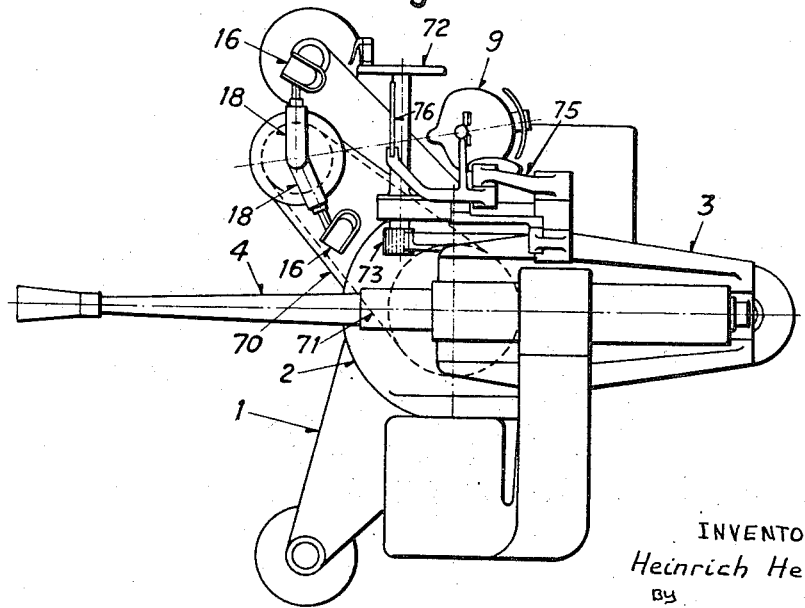
Figure 14 is a plan view of the gun carriage according to Figure 13.

In Figures 13 and 14 a further embodiment of a gun carriage according to the invention is represented, the said embodiment being more particularly suitable for heavier guns. The tripod is again designated by the numeral 1, the cradle mount by 2, the cradle by 3 and the gun proper by 4. The seat 9 of the gunner is located laterally of the cradle mount 2 and the pedals 16 with the mounts 18 are disposed on an outrigger 70. The movement of the clamping plate is transmitted by a chain 71. A handwheel 72 is provided for aiming the gun in elevation, said handwheel acting on the rigid gear segment 74 through a pinion 73. The sight, which is controlled through a parallelogram 75, is designated by the numeral 76.

Finally, Figures 15 and 16 show a still further embodiment of a change speed gear such as can be used with gun carriages of the type exemplified by Figure 9. The pedals are designated by the numeral 16, their mounts by 18, and the clamping plate by 32. Journalled in the outrigger 80 is a hollow shaft 81 the upper end of which is closed by a coverplate 82. The hollow shaft 81 carries the chain wheel 83 and the clutch plate 84. The plate 32 is rotatably mounted on the hollow shaft and has studs 85 which engage holes in the clutch casing 86. As a result, the clutch casing 86 rotates together with the plate 32 according to the pedal movements. The clutch casing 86 is mounted on the longitudinally movable ring 87 and engages the clutch plates 84 and 88 alternately. The clutch plate 84 is, as already mentioned, rigidly connected to the hollow shaft 81 and therefore to the chain wheel 83. The clutch plate 88, which is rotatably mounted on the hollow shaft 81, is provided with teeth 89. Disposed on a planetary-gear support 90 connected to the hollow shaft 81 are, for example, two planetary gears 91 which engage at one side the toothed rim 92 rigidly mounted in the outrigger 80 and at the other side the toothing 89 of the clutch plate 88. For the purpose of changing the gear, a lever 94, which is actuated by a connecting rod 95, is pivotally mounted on a boss 93 of the outrigger 80. The lever 94 acts on a ram or plunger 96 which is mounted in the hollow shaft 81 and is forced upwards by the spring 97. The plunger 96 is connected to the ring 87 by the bolt 98 and thereby causes sliding of the clutch housing 86.

The following is a brief description of the functioning of the arrangement: In the position of the gear shown in Figure 15, the rotary movement of the plate 32 is transmitted by the bolts 85 to the clutch casing 86. The latter is operatively connected to the clutch plate 88 which drives the hollow shaft 81, and therefore the chain wheel 83, through the toothing 89, and the planetary gears 91. In order to change the gear to a higher aiming speed, the plunger 96 is moved downwards by the lever 94 against the action of the spring 97. Thereby, the clutch casing 86 is drawn downwards by the ring 87 and brought into engagement with the clutch plate 84. Consequently, the movement of the plate 32 is transmitted through the clutch casing 86 and clutch plate 84 directly to the hollow shaft 81 and the chain wheel 83. In this manner a smooth changeover from one aiming speed to the other can be effected.

In Figures 19 and 20 a further embodiment of a gun training gear according to the invention is shown, which embodiment largely coincides with that shown in Figures 15 and 16. As distinct from the last-mentioned embodiment, in the embodiment to Figures 19 and 20 a rigid support or mount 100 extending right across is provided on a shoulder of the clamping plate 32. A swivelling pedal 16 is provided at one end of the support or mount 100, which pedal 16 can, as in the preceding examples, be coupled to the clamping plate 32 by means of the lever 19 and the clamping wedge 22 on the support 100. At the other end of the support 100 the pedal 101 is rigidly attached. A foot-lever 102 is pivotally mounted in a boss 100a, and can be operated by the gunner's left foot. The lever 102 acts through the connection rod 103 on the bell crank 104, which actuates the longitudinally sliding ring 87 through the plunger or ram 105, thereby changing the gear.

The following is a brief description of the functioning of this embodiment: As in the previously described embodiments, the pedal 16, when operated, moves the clamping plate 32 and thereby actuates the training gear. For normal gun-training purposes the foot-lever 102 is not operated, but if high aiming speeds are required for brief periods, the gunner, by operating the foot-lever 102, engages the higher training speed via connecting rod 103, bell crank 104 and ram or plunger 105.

The arrangement of the seat and pedal can be so devised that the gun-training drive imparted by the gunner's legs is approximately constant throughout the range of action of the pedals. As schematically represented in Figures 17 and 18, the force exerted by the gunner's feet alters, as the leg is increasingly extended, from P1 at leg-extension "a" to P2 at leg-extension "b." By correct selection of the leg-extension and pedal radius, however, it is possible to achieve the result that the product of the initial foot-power P1 and the initial distance $l_1$ of the pedal from the pivotal axis is equal to the product of the foot-power at the end of the swivelling range, P2, and the corresponding distance $l_2$, so that an approximately constant gun-aiming force is exerted throughout the swivelling range of the pedal.

The embodiments described and illustrated are, needless to say, only a few of the many possibilities of realizing the inventive idea.

I claim:

1. In a gun, a carriage comprising a lower immovable supporting member and a cradle mount rotatably mounted upon said supporting member to carry out a training movement; a gunner seat connected to said cradle mount, at least one pedal, means rotatable about a substantially vertical axis, means carried by said rotatable means and connected with said pedal for a joint swinging movement, a coupling element connected to said lower supporting member and having a coupling surface extending concentrically to said axis, and a clamping device connected to said pedal-connected means and having a clamping member for engaging said coupling surface and providing a clamping connection between said clamping device and said coupling element when the pedal is swung by the gunner, whereby the gunner can rotate the cradle mount relatively to the lower supporting member by pressure exerted upon said pedal and sustained by said gunner seat during said clamping connection.

2. In a gun, a carriage comprising a lower immovable supporting member, and a cradle mount rotatably mounted upon said supporting member to carry out a training movement; a gunner seat connected to said cradle mount, two pedals, means rotatable about a substantially vertical axis, pivots extending in opposite directions relatively to said axis and carried by said rotatable means, each of said pivots being firmly connected with a separate pedal for a joint swinging movement therewith, a coupling element connected to said lower supporting member and extending concentrically to said axis, and clamping devices connected with said pivots and providing a clamping connection between each clamping device and said coupling element when the pedal connected to that clamping device is swung by the gunner, whereby the gunner can rotate the cradle mount relatively to the lower supporting member in opposite directions by pressure exerted upon said pedals and sustained by the gunner seat by successively actuating said clamping devices.

3. In a gun, a carriage comprising a lower immovable supporting member and a cradle mount rotatably mounted upon said supporting member to carry out a training movement; a gunner seat connected to said cradle mount, at least one pedal, means rotatable about a substantially vertical axis, a pivot carried by said rotatable means and firmly connected with said pedal for a joint swinging movement therewith, a coupling element connected to said lower supporting member and having a coupling surface extending concentrically to said axis, and a clamping device connected with said pivot and having a clamping roller engaging said coupling surface to provide a clamping connection between the clamping device and the coupling element when the pedal is swung by the gunner.

4. In a gun, a carriage comprising a lower immovable supporting member and a cradle mount rotatably mounted upon said supporting member to carry out a training movement; a gunner seat connected to said cradle mount, at least one pedal, a rotary pivot carrying said pedal and firmly connected therewith, said pedal and said pivot being swingable about a vertical axis which is perpendicular to the axis of rotation of said pivot, a coupling element connected with said lower supporting member and having a coupling surface extending concentrically to said vertical axis, a clamping device connected with said pivot and having a clamping member engaging said coupling surface and providing a clamping connection between said clamping device and said coupling element when said pedal is swung by the gunner, and means carrying said pivot and mounted in said cradle mount for rotation about said vertical axis.

5. In a gun, a carriage comprising a lower immovable supporting member and a cradle mount member mounted upon said supporting member for rotation about a substantially vertical axis; a gunner seat connected to said cradle mount member, at least one pedal, means rotatable about said axis and mounted in one of said members, means carried by said rotatable means and connected with said pedal for a joint swinging movement; a coupling element connected with said lower supporting member and having a coupling surface extending concentrically to said axis, and a clamping device connected to said pedal-connected means and having a clamping member for engaging said coupling surface and providing a clamping connection between said clamping device and said coupling element when the pedal is swung by the gunner, whereby the cradle mount member is rotated by pressure exerted upon said pedal and sustained by said gunner seat during said clamping connection.

6. In a gun, a carriage comprising a lower immovable supporting member and a cradle mount mounted upon said supporting member for rotation about a substantially vertical axis; a gunner seat connected to said cradle mount, at least one pedal, a pivot rotatable about an axis which is parallel to the first-mentioned axis, means supporting said pedal for rotation about said pivot, a coupling element keyed upon said pivot and having a coupling surface extending concentrically to the second-mentioned axis; a clamping device operatively connected with said pedal for engaging said coupling surface, and means operatively connecting said lower carriage member with said pivot.

7. A gun in accordance with claim 6, wherein the last-mentioned means include a speed-varying gear drive.

References Cited in the file of this patent

UNITED STATES PATENTS

| 1,700,902 | Prieur | Feb. 5, 1929 |
| 1,855,069 | Ricordel | Apr. 19, 1932 |
| 1,900,999 | Ricordel | Mar. 14, 1933 |
| 2,415,024 | Allen | Jan. 18, 1947 |
| 2,486,526 | Gross | Nov. 1, 1949 |
| 2,582,225 | Bowser et al. | Jan. 15, 1952 |

FOREIGN PATENTS

| 666,317 | Germany | Oct. 17, 1938 |